D. de CASTRO & R. BURTON.
Gas Meters.

No. 141,263.  Patented July 29, 1873.

WITNESSES:
Edmund Edwards.
Charles James Wintersgill.

INVENTORS:
Daniel de Castro.
Richard Burton.

UNITED STATES PATENT OFFICE.

DANIEL DE CASTRO, OF MORTLAKE, SURREY, AND RICHARD BURTON, OF CAMDEN TOWN, LONDON, ASSIGNORS TO THE IMPERIAL METER COMPANY, OF LONDON, ENGLAND.

IMPROVEMENT IN GAS-METERS.

Specification forming part of Letters Patent No. 141,263, dated July 29, 1873; application filed July 7, 1873.

*To all whom it may concern:*

Be it known that we, DANIEL DE CASTRO, of Mortlake, Surrey, England, and RICHARD BURTON, of Camden Town, London, England, have invented Improvements in Gas-Meters; and we do hereby declare that the following is a full, clear, and exact description thereof, reference being had to the accompanying drawing making part of this specification, in which—

Figure 1:
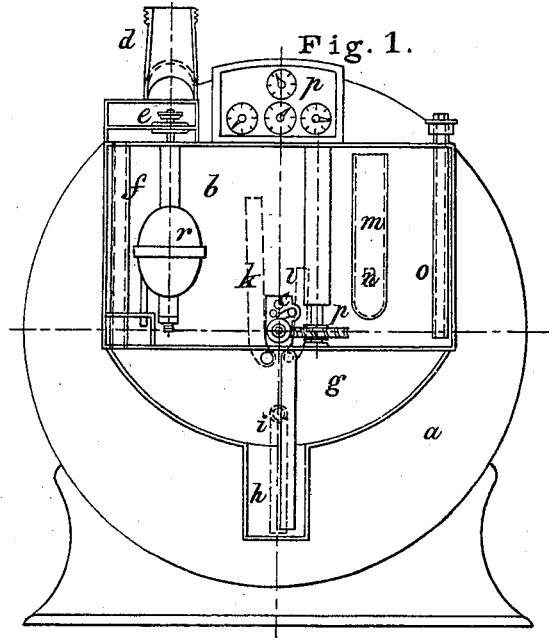
Figure 2:
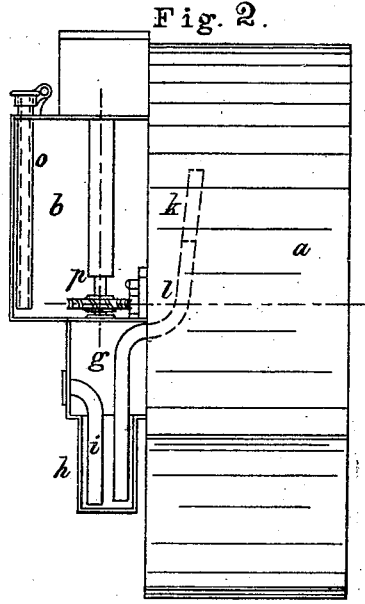
Figure 3:
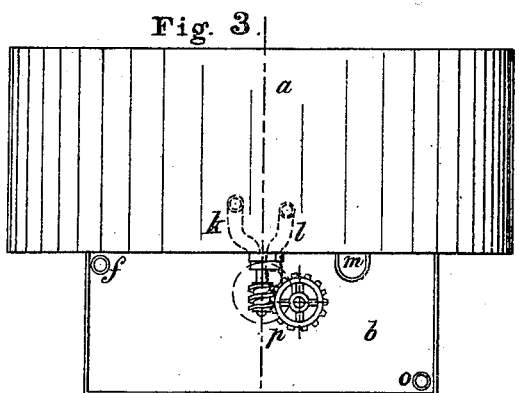
Figure 4:
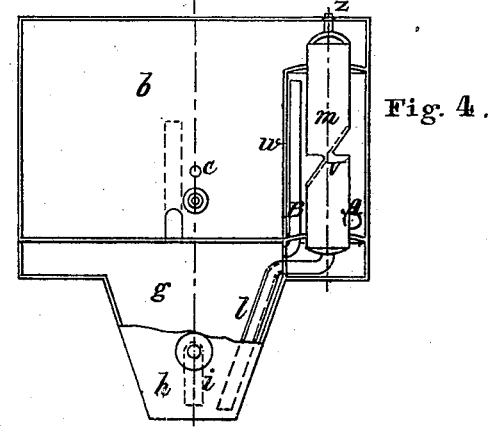
Figure 5:
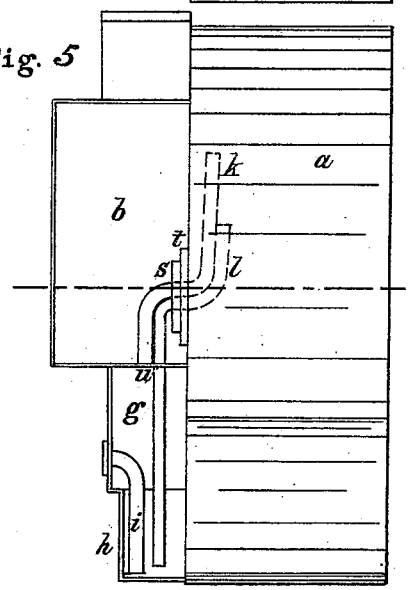

Figure 1 is a front view, partly in section, of a gas-meter. Fig. 2 is a side view, partly in section; and Fig. 3 is a plan, partly in section, of the same. Fig. 5 is an end view, partly in section, of a modified arrangement of the same; and Fig. 4 is a partial front view, partly in section, of a modified arrangement of the same.

Similar letters of reference indicate corresponding parts in the several figures.

This invention relates to novel improvements in that form of gas-meter known as the "wet meter," in which the indication of the quantity of gas passing through it depends upon the accurate adjustment of the level of the water which the measuring-chamber contains; and consists of novel improvements in the construction and arrangement of that part of the apparatus by which the level of such water is adjusted.

In the accompanying drawing, $a$ represents the drum-case, in which revolves a measuring-drum, constructed in the method usual in "wet" gas-meters. $b$ is a reservoir in front of the meter containing a store of water, from which the drum-case $a$ is supplied through the hole $c$. The gas is admitted from the inlet-pipe $d$, through the valve $e$ and the pipe $f$, (which passes through the reservoir $b$,) into the chamber $g$, the lower part of which forms the waste-water box $h$, the water escaping through the overflow-pipe $i$, a sufficient depth being always retained in the box $h$ to make a perfect "seal"-joint. From the chamber $g$ the gas passes into the interior of the drum through the pipe $k$, the inner end of which is turned up sufficiently high to be above the level of the water in the drum. The pipe $l$ also passes into the interior of the drum, its inner end being adjusted to the exact level at which the water in the drum stands when the meter is indicating correctly, and it may have an outer end turned down nearly to the bottom of the waste-water box $h$. $m$ is a pipe (preferably semicircular in plan) closed at its lower end, and having its upper end open and brought up nearly to the top of the reservoir $b$. An opening, $n$, communicates between the interior of the pipe $m$ and the interior of the drum-case $a$, and has its upper edge adjusted so as to be level with, or very slightly below, the level at which the water stands in the drum-case $a$ when the meter is indicating correctly. $o$ is a pipe, by which the reservoir $b$ is filled, reaching nearly to the bottom of the reservoir. Its upper end may be closed by a cap or stopper.

The operation of this device is as follows: The reservoir $b$ is filled with water, (through the pipe $o$,) which, passing through the hole $c$ and down the pipe $m$, fills the drum-case and drum to the proper level. If the level of the water in the drum-case $a$ becomes too low, from evaporation or other cause, a bubble of gas passes through the opening $n$ up the pipe $m$ into the upper part of the reservoir $b$, and, by displacement, allows a corresponding quantity of water from the reservoir to enter the drum-case through the hole $c$. If there be too much water in the drum the surplus water passes down the tube $l$ into the waste-water box $h$, and the exact level of the water in the drum is thus maintained so long as the level of the water in the reservoir $b$ is above the level of that in the drum. The number of revolutions of the drum, and consequently the quantity of gas passing through the meter, is indicated by the registering apparatus $p$, which may be constructed in the usual way. The float $r$ is connected to the valve $e$, and shuts off the supply of gas entering the meter if the level of the water in the reservoir $b$ falls too low. We prefer to arrange the pipe $m$ as near as convenient to the center of the meter, so that its accurate operation may be less effected if the meter is not placed exactly level.

Fig. 5 shows a modification of the device described, in which the gas-pipe $k$ and the waste-water pipe $l$ are both fixed to a plate, $s$, which is capable of a certain amount of vertical movement, by which the exact level of the inner end of the waste-water pipe is adjusted, and the plate $s$ is then soldered or othwise fixed to the plate $t$, and the two pipes are also soldered to the bottom of the reservoir $b$, where they pass through it at $u$.

In Fig. 4 another modification of the method of adjusting the exact level of the waste-water pipe is shown, in which a single pipe, $m$, is used instead of the pipes $l$ and $m$, shown in Figs. 1, 2, 3, and 5. The pipe $m$ is divided by a diagonal partition, $v$, on either side of which is an opening communicating with the top and bottom of the pipe, respectively. The upper end of the pipe $m$ opens into the reservoir $b$, and its lower end is attached to the waste-water pipe $l$ leading to the bottom of the waste-water reservoir $h$. The pipe $m$ is contained in a separate chamber, $w$, the top and bottom of which (to which the pipe is fixed) are made of lead or other sufficiently flexible material, so that the exact level of the openings in the pipe at $v$ can be adjusted by the rod $z$. An opening, A, communicates between the chamber $w$ and the drum-case, and gas is admitted into the upper part of the chamber $w$ through the pipe B.

Having now described our invention, what we claim as new is—

1. The combination, in wet gas-meters, of the water-reservoir $b$ with the adjusted waste-water pipe $l$, and the pipe $m$ having an adjustable opening for admitting gas into the water-reservoir when required, and the pipe $k$ for admitting gas to the drum, arranged substantially as and for the purposes explained.

2. The flexible top and bottom of the chamber $w$, by which the height of the pipe $m$ is regulated, substantially as and for the purposes described.

In testimony whereof we have signed our names to this specification in the presence of two subscribing witnesses.

DANIEL DE CASTRO.
RICHARD BURTON.

Witnesses:
EDMUND EDWARD,
CHARLES JAMES WINTERSGILL.